(12) United States Patent
Dou et al.

(10) Patent No.: US 12,270,354 B2
(45) Date of Patent: Apr. 8, 2025

(54) WORK VEHICLE POWER SYSTEM WITH LOW CARBON FUEL BLENDS

(71) Applicant: Deere & Company, Moline, IL (US)

(72) Inventors: Danan Dou, Cedar Falls, IA (US); Craig W. Lohmann, Cedar Falls, IA (US); Taner Tuken, Cedar Falls, IA (US); Daniel A. Nehmer, Hudson, IA (US); Barbara E. Goodrich, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 32 days.

(21) Appl. No.: 18/324,549

(22) Filed: May 26, 2023

(65) Prior Publication Data

US 2023/0407807 A1    Dec. 21, 2023

Related U.S. Application Data

(60) Provisional application No. 63/366,364, filed on Jun. 14, 2022.

(51) Int. Cl.
*F02D 41/14* (2006.01)
*F02D 19/06* (2006.01)
(Continued)

(52) U.S. Cl.
CPC ..... *F02D 41/1454* (2013.01); *F02D 19/0602* (2013.01); *F02D 19/0634* (2013.01);
(Continued)

(58) Field of Classification Search
CPC ............. F02D 19/0602; F02D 19/0634; F02D 19/0644; F02D 19/0655; F02D 41/0002;
(Continued)

(56) References Cited

U.S. PATENT DOCUMENTS 10,145,319 B1 * 12/2018 Engfehr ................. F02D 19/105
2011/0010075 A1 *  1/2011 Rogers .................. F02D 19/081
                                                                73/114.42

(Continued)

OTHER PUBLICATIONS

Performance Trends, Inc.—Wide Band UEGO A/F(lambda) Sensors, Affordable, Rugged True A/F Sensors and Controller for Accurate Engine Tuning and Troubleshooting on Dyno or In Vehicle, Dec. 2015.

(Continued)

*Primary Examiner* — Logan M Kraft
*Assistant Examiner* — Johnny H Hoang
(74) *Attorney, Agent, or Firm* — KLINTWORTH & ROZENBLAT IP LLP (57) ABSTRACT

A power system for a work vehicle includes an intake arrangement for intake of charge air; a fuel arrangement including a fuel tank storing a low carbon fuel blend; an engine configured to receive, ignite, and combust a mixture of the charge air and the low carbon fuel blend; an exhaust arrangement positioned downstream to receive exhaust from the engine during combustion of the low carbon fuel blend; at least one exhaust sensor positioned at or proximate to the exhaust arrangement; and a controller. The controller is configured to receive an initial indication of a composition of the low carbon fuel blend; implement operating parameters with feedforward adjustments based on the initial indication of the composition of the low carbon fuel blend; receive feedback from the at least one exhaust sensor regarding operational conditions; and adjust the operating parameters based on the feedback.

20 Claims, 3 Drawing Sheets

(51) Int. Cl.
  *F02D 41/00* (2006.01)
  *B62D 49/06* (2006.01)
(52) U.S. Cl.
  CPC ..... *F02D 19/0644* (2013.01); *F02D 19/0655* (2013.01); *F02D 41/0002* (2013.01); *F02D 41/146* (2013.01); *B62D 49/06* (2013.01); *F02D 2200/0611* (2013.01)
(58) Field of Classification Search
  CPC .............. F02D 41/1454; F02D 41/146; F02D 2200/0611; F02D 41/0025; F02D 41/0027; F02D 41/1452; F02D 19/087; F02D 2041/141; F02D 41/021; F02D 25/00; F02D 29/02; F02D 19/0618; F02D 19/0647; F02D 19/081; F02D 41/1444; F02D 41/266; B62D 49/06; Y02T 10/30; Y02T 30/00; B61C 5/00; F02B 29/0437; F02B 29/0425; B60W 2530/213
  See application file for complete search history.

(56) References Cited

U.S. PATENT DOCUMENTS

| | | | |
|---|---|---|---|
| 2016/0327464 A1* | 11/2016 | Rasmussen | F02B 43/00 |
| 2021/0087981 A1* | 3/2021 | Wang | F02D 41/0027 |
| 2022/0025826 A1* | 1/2022 | Gallagher | F02D 41/021 |

OTHER PUBLICATIONS

Niterra Sensors Products @ https://www.ngkntk.co.jp/english/product/sensors_plugs/, 2023, Niterra Co., Ltd. (3 pages).

* cited by examiner

WORK VEHICLE POWER SYSTEM WITH LOW CARBON FUEL BLENDS

CROSS-REFERENCE TO RELATED APPLICATION(S)

This application is a nonprovisional application of, and claims priority to, U.S. Provisional Patent Application 63/366,364, filed Jun. 14, 2022, which is hereby incorporated by reference.

STATEMENT OF FEDERALLY SPONSORED RESEARCH OR DEVELOPMENT

Not applicable.

FIELD OF THE DISCLOSURE

This disclosure generally relates to work vehicles, and more specifically to work vehicle power systems and methods.

BACKGROUND OF THE DISCLOSURE

Heavy work vehicles, such as used in the construction, agriculture, and forestry industries, typically include a power system with an internal combustion engine. Such engines may be spark-ignition engines or compression-ignition engines that use fossil fuels to provide desired efficiency and performance characteristics for associated work operations. However, such fuels may generate undesirable emissions.

SUMMARY OF THE DISCLOSURE

The disclosure provides a work vehicle and power system that operate with a blend of low carbon fuels, such as methanol ($CH_3OH$), ethanol ($C_2H_6O$), methane ($CH_4$), and hydrogen ($H_2$).

In one aspect, a power system is provided for a work vehicle. The power system includes an intake arrangement configured to intake charge air; a fuel arrangement including a fuel tank configured to store a low carbon fuel blend; an engine including a plurality of piston-cylinder sets configured to receive, ignite, and combust a mixture of the charge air and the low carbon fuel blend; an exhaust arrangement positioned downstream to receive exhaust from the engine during combustion of the low carbon fuel blend; at least one exhaust sensor positioned at or proximate to the exhaust arrangement; and a controller coupled to the at least one exhaust sensor, the intake arrangement, the fuel arrangement, and the engine. The controller is configured to: receive an initial indication of a composition of the low carbon fuel blend; implement operating parameters with feedforward adjustments based on the initial indication of the composition of the low carbon fuel blend; receive feedback from the at least one exhaust sensor regarding operational conditions; and adjust the operating parameters based on the feedback from the at least one exhaust sensor.

In an example of the power system, at least one fuel sensor is positioned at or proximate to the fuel tank of the fuel arrangement.

In an example of the power system, the initial indication of the composition of the low carbon fuel blend is based on information from the at least one fuel sensor positioned at or proximate to the fuel tank of the fuel arrangement.

In an example of the power system, the at least one fuel sensor is a density sensor.

In an example of the power system, the at least one fuel sensor is a conductivity sensor.

In an example of the power system, the initial indication of the composition of the low carbon fuel blend is based on information from the at least one exhaust sensor.

In an example of the power system, the controller is configured to operate the intake arrangement, the fuel arrangement, and the engine in a lean combustion mode.

In an example of the power system, the engine is a compression ignition engine.

In an example of the power system, the low carbon fuel blend is an ethanol ($C_2H_6O$) and biodiesel (B100) fuel blend.

In an example of the power system, the low carbon fuel blend a methanol ($CH_3OH$) and biodiesel (B100) fuel blend.

In an example of the power system, the engine is a spark ignition engine, and wherein the low carbon fuel blend is a methane ($CH_4$) and hydrogen ($H_2$) fuel blend.

In an example of the power system, the at least one exhaust sensor includes a carbon dioxide ($CO_2$) sensor arranged in or proximate to the exhaust arrangement.

In an example of the power system, the at least one exhaust sensor includes an oxygen ($O_2$) sensor arranged in or proximate to the exhaust arrangement.

In the power system, the at least one exhaust sensor includes a nitrogen oxide ($NO_x$) sensor, an oxygen ($O_2$) sensor, and a carbon dioxide sensor ($CO_2$) positioned at or proximate to the exhaust arrangement.

In a further aspect, a method is provided for operating a power system with an intake arrangement, a fuel arrangement with a low carbon fuel blend, an engine, and an exhaust arrangement. The method includes determining, at a controller, an initial indication of a composition of the low carbon fuel blend; implementing, by the controller, operating parameters for the fuel arrangement, the intake arrangement, and the engine with feedforward adjustments based on the initial indication of the composition of the low carbon fuel blend; receiving, at the controller, feedback from the at least one exhaust sensor regarding operational conditions; and adjusting the operating parameters based on the feedback from the at least one exhaust sensor In an example of the method, the power system further includes the at least one fuel sensor positioned at or proximate to the fuel tank of the fuel arrangement, and the determining the initial indication of a composition of the low carbon fuel blend includes determining the initial indication based on information from the at least one fuel sensor.

In an example of the method, the at least one fuel sensor is at least one of a density sensor or a conductivity sensor.

In an example of the method, the low carbon fuel blend is one of an ethanol ($C_2H_6O$) and biodiesel (B100) fuel blend, a methanol ($CH_3OH$) and biodiesel (B100) fuel blend, or a methane ($CH_4$) and hydrogen ($H_2$) fuel blend.

In an example of the method, wherein the at least one exhaust sensor includes at least one of a nitrogen oxide ($NO_x$) sensor, an oxygen ($O_2$) sensor, and a carbon dioxide sensor ($CO_2$) positioned at or proximate to the exhaust arrangement.

In an example of the method, the method further includes commanding, with the controller, operation according to an expected stoichiometric A/F ratio; determining a resulting A/F ratio; comparing the resulting A/F ratio to the expected stoichiometric A/F ratio in order to evaluate the determination of the composition of the low carbon fuel blend.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed power system and method, as shown in the accompanying figures of the drawings described briefly above. Various modifications to the example embodiments may be contemplated by one of skill in the art. Discussion herein may sometimes focus on the example application of power system in a tractor, but the disclosed power system is applicable to other types of work vehicles and/or other types of engine systems.

Work vehicles may include power systems that typically have diesel engines to produce torque in a wide range of applications, such as long-haul trucks, tractors, agricultural or construction vehicles, surface mining equipment, non-electric locomotives, stationary power generators and the like. Even though such engines may have advantageous energy and performance characteristics, diesel, gasoline, and other types of fossil fuel-based engines may generate undesirable emissions.

In contrast to diesel, gasoline, and other traditional fossil fuels, other, less widely used fuels such as ethanol ($C_2H_6O$), biodiesel (B100), methanol ($CH_3OH$), methane ($CH_4$), hydrogen ($H_2$), and mixtures thereof may have benefits with respect to both sourcing and emissions. In particular, a blend of fuel may be formed by an alcohol (e.g., ethanol ($C_2H_6O$) or methanol ($CH_3OH$)) and biodiesel (B100) or by methane ($CH_4$) and hydrogen ($H_2$). Generally, ethanol ($C_2H_6O$) or methanol ($CH_3OH$) and biodiesel (B100) are liquid fuel blends; and methane ($CH_4$) and hydrogen ($H_2$) is a gaseous fuel blend. Examples of biodiesel would include fatty acid methyl esters or fatty acid ethyl esters. Ethanol or methanol containing fuel blends may, in some instances, include water, depending on the storage dryness of the ethanol or methanol used to form the blend since ethanol and methanol are more hydrophilic than pure diesel or gasoline. In some examples, ethylene, ethane, or propane may be used in lieu of methane ($CH_4$), particularly if such fuel is provided via a low pressure tank or directly via pipeline for stationary applications.

Collectively, these fuels (e.g., ethanol ($C_2H_6O$), methanol ($CH_3OH$), biodiesel (B100), methane ($CH_4$), and hydrogen ($H_2$) are considered low carbon fuels, which include any fuel with lower lifecycle carbon impact (e.g., considering not only emissions from the combustion process, but additionally from sourcing, refining, and/or waste processes) than those of traditional diesel. Individually, such fuels may have challenges, but as a blend, the fuels may have combustion and emissions characteristics that complement one another. As such, it may be beneficial to use a blend as a fuel source, even though the blend level may be subject to variation based on market region, seasonality, and fuel availability. The characteristics of such fuels and more traditional fuels are summarized in Table 1 below.

TABLE 1

| Fuel | Low Heating Value (MJ/Kg) | Stoich A/F | $CO_2$ % in Exhaust at Stoich | Cetane Number | Octane Number | Fuel O/C Molar Ratio |
|---|---|---|---|---|---|---|
| Diesel | 42.7 | 14.5 | 20.5% | 45 | N/A | 0 |
| Renewable Diesel | 44 | 14.9 | 19.6% | 80 | N/A | 0 |
| B100 | 36.7 | 12.5 | 21.0% | 50 | N/A | 0.12 |
| DME | 29 | 9 | 19.2% | 55 | <20 | 0.5 |
| Ethanol | 27 | 9.0 | 19.2% | 12 | 113 | 0.5 |
| Gasoline | 42.9 | 14.5 | 20.5% | N/A | 87 | 0 |
| Propane | 46.3 | 15.6 | 18.1% | <10 | 104 | 0 |
| Methanol | 19.6 | 6.4 | 18.5% | 5 | 119 | 1 |
| $CH_4$ | 50 | 17.2 | 15.1% | N/A | 110 | 0 |
| $H_2$ | 121 | 34.3 | 0.0% | N/A | 130 | 0 |

Unlike diesel, which is free of oxygen and has relatively constant H/C ratio density, low carbon fuels contain varying ratios of carbon (C), hydrogen ($H_2$), and oxygen and densities, as well as varying energy content and affecting combustion characteristics. As such, conventional systems may be subject to issues with combustion stability from fuel blend variations, and the power output may not be sufficiently stable and the resulting emissions may be an issue. Therefore, effective management of combustion and emissions should be addressed during operation with low carbon fuel blends.

In the disclosure described herein, the power systems and methods may implement combustion control strategies to address both engine performance and emissions for a blended fuel. Moreover, the power systems and methods may have emission control strategies to further address emissions issues for such a fuel blend. In particular, power systems and methods may implement such control operation using various sensors or other sources to determine an initial indication of the constituents of the fuel blend and a feedforward strategy to provide the desired ignition and combustion characteristics while enabling the use of the low carbon fuels that may have more desirable costs and/or reduced emissions, including lower carbon dioxide ($CO_2$), nitrogen oxides ($NO_x$), and other undesirable emissions. Such implementation may apply to new engine designs, existing engine designs, and retrofit kits offered for engines in the field.

The feedforward control strategy may be applied to fuel blends of low carbon fuels in various combustion modes, including a lean combustion mode in which fuel energy content and hydrogen/carbon (C)/oxygen ratio are subject to variation, particularly upon consideration of different combustion characteristics, such as auto ignition temperature, ignition delay, different stoichiometric air-fuel (A/F) ratios and knock limits. Examples of such fuel blends are ethanol ($C_2H_6O$)/biodiesel (B100), methanol ($CH_3OH$)/biodiesel (B100), and methane ($CH_4$)/hydrogen ($H_2$).

As introduced above, the power systems and methods described herein may include a feedforward control scheme. A control system that has only feedforward behavior responds to its control signal in a predefined way without responding to the way the load reacts; and it is in contrast with a system that relies upon feedback to adjust the input. In other words, in a feedforward system, the control variable adjustment is not error-based, but instead, the adjustment is based on knowledge about the process in the form of a mathematical model of the process and knowledge about, or measurements of, the process disturbances. In effect, in the feedforward control scheme, the external command or controlling signal should be available, and the effect of the output of the system on the load should be known. With feedforward control, the disturbances are measured and accounted for before they have time to affect the system.

From this strategy, desired parameters for combustion control at different speeds and torques are determined and optimized to maximize fuel efficiency and reduce emissions. In particular, calibrated parameters such as fuel quantity, start of injection, desired air-fuel (A/F) ratio and EGR rate, and the like are stored as end of line calibration parameter tables in a controller.

In addition to the feedforward control strategy, the power system and method may consider emissions information from one or more of a nitrogen oxide ($NO_x$) sensor, an oxygen ($O_2$) sensor, and a carbon dioxide sensor ($CO_2$) positioned at or proximate to the exhaust arrangement. Such emission information may be used as feedback to refine the operating parameters.

As such and as described in greater detail below, control and diagnostic methods are provided to properly control the engine combustion and emission of these fuel blends. Such control and diagnostic methods may be applied across power systems for different blends of low carbon fuels, including reacting to fuel blend changes by dynamically adjusting combustion recipes and ensuring proper control of aftertreatment. For example, such control and diagnostic methods may be applicable to a fuel blend contains two fuels with drastically different cetane numbers for a compression ignition engine as in the case of ethanol ($C_2H_6O$) and biodiesel (B100). In the case of methane ($CH_4$)/hydrogen ($H_2$) blend, hydrogen ($H_2$) has a lower ignition energy requirement and is sensitive to pre-ignition by cylinder hot spots than methane ($CH_4$). Depending on the hydrogen ($H_2$) blend levels, air-fuel (A/F) ratios, EGR and ignition timing may be adjusted accordingly.

In one example, the power system may include a conductivity sensor in order to evaluate fuel content. Generally, conductivity sensors may use conductivity differences between fuel constituents in order to determine the composition. In a further example, the power system may include a density sensor in order to evaluate fuel content. During operation, such blend composition information may be provided to the controller to adjust fuel injection qualities in a feedforward manner to correct for the energy content of the fuel blend and deliver the targeted power output.

Additionally, various types of sensors may use characteristics such as those listed in Table 1 to evaluate the composition of a fuel blend and/or to improve the performance of such blends. As an example, since combustion of hydrogen ($H_2$) produces no carbon dioxide ($CO_2$), the carbon dioxide ($CO_2$) concentration in exhaust of a methane ($CH_4$) and hydrogen ($H_2$) fuel blend will be indicative of how much methane ($CH_4$) is in the fuel mixture. As a further example, ethanol ($C_2H_6O$) has an oxygen and carbon molar ratio of 0.5 and a very low cetane number (e.g., less than 5) with lower heating value while biodiesel (B100) has a high cetane number (e.g., greater than 50) and higher heat value than ethanol ($C_2H_6O$). When ethanol ($C_2H_6O$) is blended with biodiesel (B100), the ignition delay will be highly dependent on the biodiesel (B100) concentrations. As the relative amount biodiesel (B100) in the blend increases, the resulting fuel will operate as a high cetane fuel with a shorter ignition delay and lower autoignition temperature than neat ethanol ($C_2H_6O$). Conversely, biodiesel (B100) blend with ethanol ($C_2H_6O$) lowers the viscosity of pure biodiesel (B100), therefore potentially lowering the cloud point that may prevent cold winter filter plugging or gelling of pure biodiesel (B100). Compression ignition of ethanol ($C_2H_6O$) produces low nitrogen oxides ($NO_x$) but combustion of pure biodiesel (B100) produces high nitrogen oxides ($NO_x$). Blending of the two are complimentary and produces a fuel that avoids the drawbacks of the respective neat fuels. Additionally, biodiesel (B100) has a sharp and high evaporation temperature which can be advantageous with respect to safety of an ethanol ($C_2H_6O$) and biodiesel (B100) blend (e.g., biodiesel (B100) has the evaporation temperature is above 300° C. and the boiling point of ethanol ($C_2H_6O$) is 78° C.). The low boiling point of ethanol ($C_2H_6O$) also indicates that air/fuel control of an ethanol ($C_2H_6O$) containing fuel may be affected by the crankcase ethanol ($C_2H_6O$) evaporation given a closed crankcase system design likely required for ethanol ($C_2H_6O$) fuels. To effectively manage the ethanol ($C_2H_6O$) and biodiesel (B100) blend, engine control may operate to adjust combustion parameters in reaction to the biodiesel (B100) blend levels in ethanol ($C_2H_6O$). One way to do so is to use a density sensor at fuel tank based on the density difference of ethanol ($C_2H_6O$) and biodiesel (B100). Alternatively, a market ethanol ($C_2H_6O$) flex fuel sensor may be used to determine the ethanol ($C_2H_6O$) concentration. Other fluid property sensors could be applied as well. Consequently, engine control strategies function to adjust injection quality, injection time, boost pressure, diluent ratio to effectively manage the power output and emission from the fuel blend. Overall, injection quality and combustion parameters may be adjusted to deliver target power, properly manage combustion and emission control.

Figure 1:
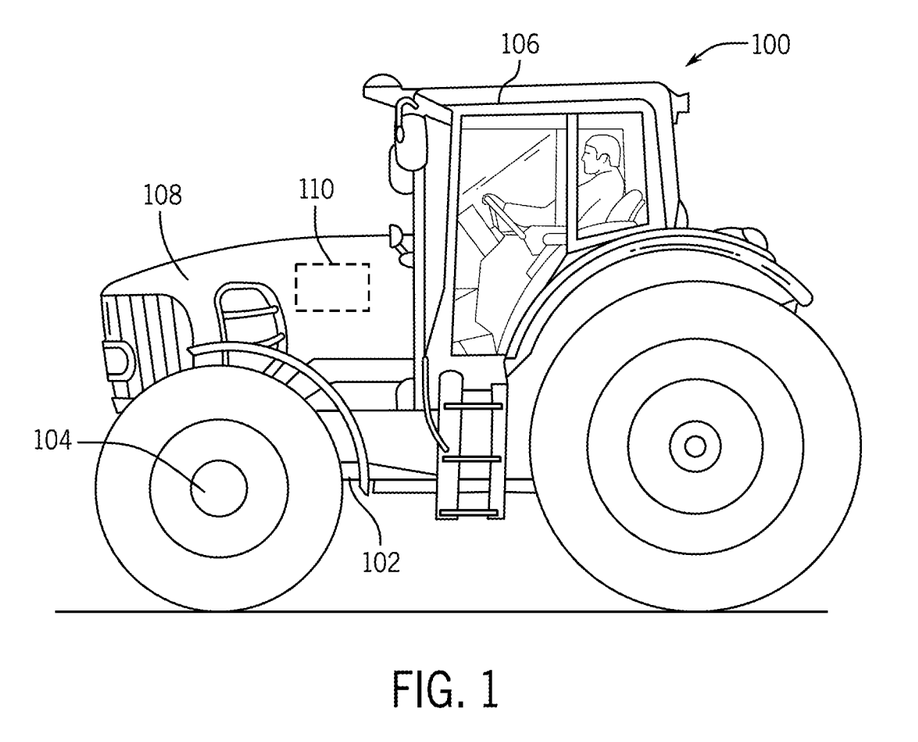
FIG. 1 is a simplified side view of an example work vehicle in the form of a tractor in which a power system may be used in accordance with an embodiment of this disclosure.

Referring to FIG. 1, in some embodiments, disclosed power systems and methods are implemented with the use of a blended fuel formed by low carbon fuels (e.g., combinations of methanol ($CH_3OH$), ethanol ($C_2H_6O$), biodiesel (B100), methane ($CH_4$), and hydrogen ($H_2$)), as discussed in greater detail below. In the depicted example, such power systems and methods are implemented with a work vehicle 100 embodied as a tractor. In other examples, the disclosed systems and methods may be implemented in other types of vehicles or machines, including stationary power systems and vehicles in the agricultural, forestry, and/or construction industries.

As shown, the work vehicle 100 may be considered to include a main frame or chassis 102, a drive assembly 104, an operator platform or cabin 106, a power system 108, and a controller 110. As is typical, the power system 108 includes an internal combustion engine used for propulsion of the work vehicle 100, as controlled and commanded by the controller 110 and implemented with the drive assembly 104 mounted on the chassis 102 based on commands from an operator in the cabin 106 and/or as automated within the controller 110.

As described below, the power system 108 may include a number of systems and components to facilitate various aspects of operation. The engine of the power system 108 may be a spark ignition engine or a compression ignition engine, depending on the nature of the fuel blend, as discussed below. The engine may utilize a blended fuel with two different types of fuel provided by a fuel arrangement, as introduced above and discussed in greater detail below.

Otherwise, the power system 108 may include an air intake arrangement to provide air that is mixed with fuel and combusted in the engine, as well as additional systems, such as turbocharger and/or exhaust arrangements, as appropriate. Although not shown or described in detail herein, the work vehicle 100 may include any number of additional or alternative systems, subsystems, and elements. Further details of the power system 108 are provided below.

As noted, the work vehicle 100 includes the controller 110 (or multiple controllers) to control one or more aspects of the operation, and in some embodiments, facilitate implementation of the power system 108, including various components and control elements associated with the use of a blended fuel of alcohol and biodiesel (B100) or methane ($CH_4$) and hydrogen ($H_2$), as discussed below. The controller 110 may be considered a vehicle controller and/or a power system controller or sub-controller. In one example, the controller 110 may be implemented with processing architecture such as a processor and memory. For example, the processor may implement the functions described herein based on programs, instructions, and data stored in memory.

As such, the controller 110 may be configured as one or more computing devices with associated processor devices and memory architectures, as a hard-wired computing circuit (or circuits), as a programmable circuit, as a hydraulic, electrical or electro-hydraulic controller, or otherwise. The controller 110 may be configured to execute various computational and control functionality with respect to the work vehicle 100 (or other machinery). In some embodiments, the controller 110 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 110 may be in electronic, hydraulic, mechanical, or other communication with various other systems or devices of the work vehicle 100 (or other machinery). For example, the controller 110 may be in electronic or hydraulic communication with various actuators, sensors, and other devices within (or outside of) the work vehicle 100, including any devices described below. In some embodiments, the controller 110 may be configured to receive input commands from, and to interface with, an operator via a human-vehicle operator interface that enables interaction and communication between the operator, the work vehicle 100, and the power system 108.

In some examples, the work vehicle 100 may further include various sensors that function to collect information about the work vehicle 100 and/or surrounding environment. Such information may be provided to the controller 110 for evaluation and/or consideration for operating the power system 108. As examples, the sensors may include operational sensors associated with the vehicle systems and components discussed herein, including engine and transmission sensors; fuel and/or air sensors; temperature, flow, and/or pressure sensors; and battery and power sensors, some of which are discussed below. Such sensor and operator inputs may be used by the controller 110 to determine an operating condition (e.g., a load, demand, or performance requirement), and in response, generate appropriate commands for the various components of the power system 108 discussed below, particularly the fuel, air, and exhaust arrangements for use of the blended low carbon fuels. Additional information regarding the power system 108 is provided below.

Figure 2:
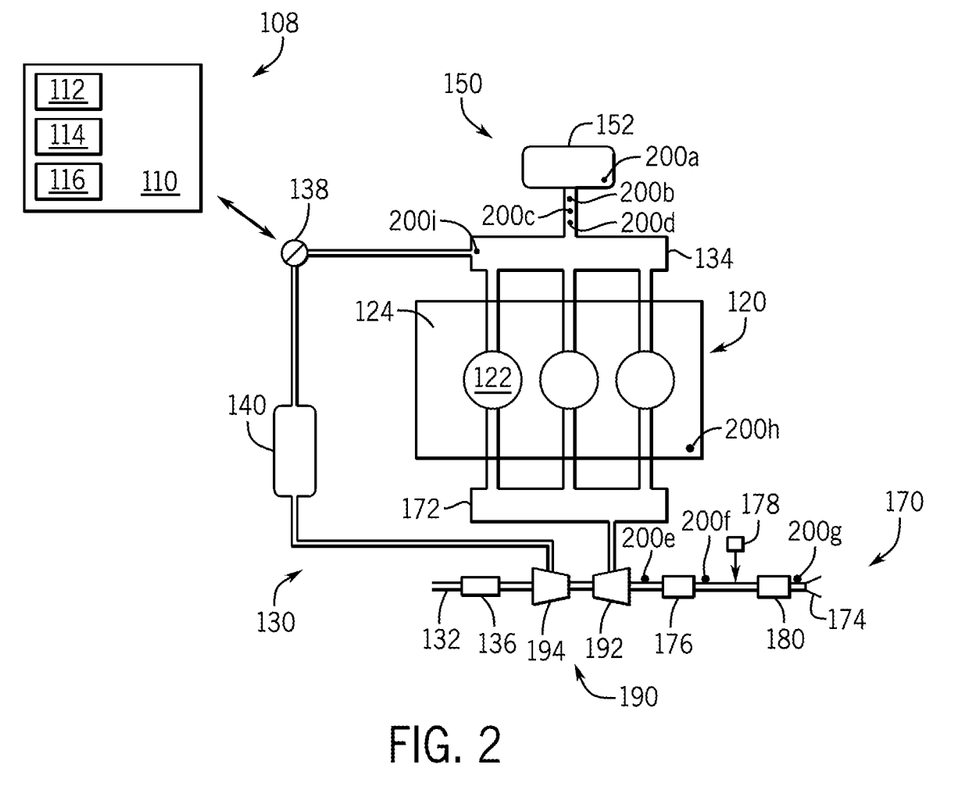
FIG. 2 is a simplified schematic diagram of a power system in accordance with an example embodiment.

Reference is now made to FIG. 2, which is a schematic illustration of the power system 108 for providing power to the work vehicle 100 of FIG. 1, although the characteristics described herein may be applicable to a variety of machines. The configuration of FIG. 2 is just one example of the power system 108 and example embodiments according to the disclosure herein may be provided in other configurations.

As introduced above, the power system 108 may be controlled with a controller 110 that includes a processor 112 that implements instructions stored in memory 114 based on various inputs, including operator commands and/or sensor input regarding the operating condition. Generally, the controller 110 may implement any of the functions described herein. As noted above, the work vehicle 100, power system 108, and/or controller 110 may include or otherwise cooperate with one or more operator interfaces 116 for controlling various aspects of the work vehicle 100, including the power system 108. Such operator interfaces 116 may include a throttle that is configured to command a load on the engine 120 of the power system 108. Additional operator interfaces 116 may include various types of input devices and/or displays.

As also introduced above, the power system 108 includes an engine 120 configured to combust a mixture of air from an air intake arrangement 130 and fuel from a fuel arrangement 150 to generate power for propulsion and various other systems, thereby generating an exhaust gas that is accommodated by an exhaust arrangement 170. As described in greater detail below after a brief description of other aspects of the power system 108, the controller 110 may command the engine 120, the air intake arrangement 130, the fuel arrangement 150, and the exhaust arrangement 170 according to one or more control modes, including a stoichiometric control mode and a lean control mode in which the air-fuel ratios are manipulated to provide desired performance and emissions characteristics.

As also noted above, the engine 120 is selectively provided air for combustion by the air intake arrangement 130. The air intake arrangement 130, in this example, includes an air intake conduit 132 and an intake manifold 134. The air intake arrangement 130 directs fresh or ambient air through the air intake conduit 132 as charge air. In this example, the intake manifold 134 may receive the charge air and additionally receive fuel from the fuel arrangement 150 such that the air and fuel are mixed prior to being directed into the engine 120. In other examples, a separate mixer may be provided and/or the fuel may be injected directly into the engine 120. In one example, the mixture of fuel and air is directed into the piston-cylinder sets 122 of the engine block 124 to be ignited. The resulting combustion products drive the mechanical output of the engine 120.

In one example, the air intake arrangement 130 may include a filter 136 (or other intake air treatment apparatus) arranged on or proximate to the air intake conduit 132 to filter the intake air. Moreover, an air throttle valve 138 may be provided to control the flow of air through the air intake arrangement 130 based on commands from the controller 110, as discussed in greater detail below. In one example, the air intake arrangement 130 may include a charge air cooler 140 to reduce the temperature of the charge air (e.g., particularly the compressed charge air from the turbocharger arrangement 190, discussed below). In this example, the charge air cooler 140 is configured to direct the charge air into proximity with cooling air (or other type of coolant) such that the heat is transferred from the charge air to the cooling air. Other cooling or heat exchange mechanisms may be provided. As noted, the intake air is directed into the engine 120 via the intake manifold 134. As described below, the intake air may be mixed with fuel in the intake manifold 134, while in other examples, the fuel and intake air may be mixed in a separate component and/or within the engine piston-cylinder sets 122.

As introduced above, the fuel arrangement 150 is configured to provide a low carbon fuel blend to the engine 120. In one example, the fuel arrangement 150 is configured to deliver a blend of methane ($CH_4$) and hydrogen ($H_2$) as the fuel. Generally, any ratio of methane ($CH_4$) and hydrogen ($H_2$) may form the blended fuel, including ratios of approximately 1% methane ($CH_4$) to 99% hydrogen ($H_2$), approximately 99% methane ($CH_4$) to 1% hydrogen ($H_2$), and any ratios in between. In a further example, the fuel arrangement 150 is configured to deliver a blend of alcohol (e.g., methanol ($CH_3OH$) or ethanol ($C_2H_6O$)) and biodiesel (B100) as the fuel. Generally, any ratio of alcohol and biodiesel (B100) may form the blended fuel, including ratios of approximately 1% alcohol to 99% biodiesel (B100), approximately 99% alcohol to 1% biodiesel (B100), and any ratios in between.

In one example, the blended fuel may be stored in a fuel tank 152. Typically, the blended fuel may be stored in gaseous or liquid form in the fuel tank 152 that is directed by the fuel arrangement 150 from the tank to the intake manifold 134 for mixing with the intake air from the air intake arrangement 130. Although not shown, additional components may be provided, including control valves, pumps, and the like.

Generally, the engine 120 may be any type of engine that utilizes the blended of the fuel arrangement 150. For example, the engine 120 a spark ignition engine or a compression ignition engine, depending on the fuel blend and overall configuration and arrangement. The engine 120 may have any number or configuration of piston-cylinder sets 122 within an engine block 124. In the illustrated implementation, the engine 120 is an inline-3 (I-3) engine defining three piston-cylinder sets 122, although other configurations may be provided, including four and six piston-cylinder sets. In addition to those discussed below, the engine 120 may include any suitable features, such as cooling systems, peripheries, drivetrain components, sensors, etc.

In one example, each of the piston-cylinder sets 122 includes a piston arranged within the cylinder to create a combustion chamber in between such that movement of the piston within the cylinder functions to facilitate the flow of gas into and out of the combustion chamber; to compress the gas within the combustion chamber to enable ignition (e.g., via spark or compression) and combustion; and to be driven by the combustion products to transfer the resulting mechanical power from the combustion process to a prime mover of the engine 120. Typically, an intake valve is arranged to open and close an intake port to admit intake gas into the combustion chamber; and an exhaust valve is arranged to open and close an exhaust port to enable gas to flow out of the combustion chamber into the exhaust arrangement 170.

The exhaust gas produced from the combustion process of the engine 120 may be received by the exhaust arrangement 170, which includes an exhaust manifold 172 to receive and distribute the exhaust from the piston-cylinder sets 122. At least a portion of the exhaust gas is directed from the exhaust manifold 172 into an exhaust conduit 174 out of the work vehicle 100. As schematically shown, the exhaust gas may flow through one or more exhaust treatment components 176, 178, 180 arranged on or proximate to the exhaust conduit 174. Generally, such exhaust treatment components 176, 178, 180 may function to treat the exhaust gas passing therethrough to reduce undesirable emissions based on commands from the controller 110. In one example, the exhaust treatment component 176 may be a particulate filter and/or a catalyst component; the exhaust treatment component 178 may be a catalyst or reductant injection component; and the exhaust treatment component 180 may be a selective catalytic reduction (SCR) system, including a vanadium-based system (V-SCR) or a copper-based system (Cu-SCR). In one example, the catalyst injection component 178 may inject a catalyst (e.g., similar to DEF) or reductant that is injected into the exhaust to react with the exhaust constituents (heat and water) in the exhaust to form ammonia, and nitrogen oxides ($NO_x$) are subsequently reduced by ammonia within the SCR system 180 to form water ($H_2O$) and nitrogen ($N_2$), which may be released into the atmosphere. In effect, collectively or individually, the exhaust treatment components 176, 178, 180 may be considered a three-way catalyst arrangement to address pollutants, including hydrocarbons and carbon monoxide (CO), and reduce nitrogen oxides ($NO_x$) into relatively harmless components such as water ($H_2O$), nitrogen ($N_2$), and carbon dioxide ($CO_2$).

In some examples, the presence of hydrogen ($H_2$) in the blend of fuel and the subsequent exhaust may promote catalyst activity since hydrogen ($H_2$) is relatively simple to oxidize and further generates additional heat to assist in the oxidation of methane ($CH_4$). As such, the hydrogen ($H_2$) facilities a more complete methane ($CH_4$) combustion inside the engine 120 and also assists methane ($CH_4$) oxidation in the exhaust stream to effectively reduce the light off temperature of a methane ($CH_4$) oxidation catalyst at both stoichiometric and lean control modes of combustion discussed below. The three-way catalytic arrangement formed by one or more of the exhaust treatment components 176, 178, 180 operates as an oxidation catalyst and efficiently oxidizes emissions. During stoichiometric combustion at relatively light loads, engine out nitrogen oxides ($NO_x$) may be relatively high along with favorable exhaust temperature in the range of 400-550° C. for effective emission control by exhaust treatment components 176, 178, 180; and as the power system 108 transitions to lean combustion at high loads, exhaust temperature will stay in the range 350-500° C. for effective nitrogen oxides ($NO_x$) reduction by exhaust treatment components 176, 178, 180 (particularly an SCR). Effectiveness of nitrogen oxides ($NO_x$) reduction by ammonia within SCR reduces as temperature exceeds 500° C.

Other arrangements may be provided and one or more of the exhaust treatment components 176, 178, 180 may be omitted. Additional details about operation of the exhaust treatment components 176, 178, 180 are provided below.

The power system 108 may further include a turbocharger arrangement 190, each of which may have at least portions that may also be considered part of (or otherwise cooperate with) the air intake arrangement 130 and/or the exhaust arrangement 170. In some examples, the turbocharger arrangement 190 may be omitted.

The turbocharger arrangement 190 generally functions to increase the amount of air subsequently directed into the engine 120 for improved engine efficiency and power output. In one example, the turbocharger arrangement 190 includes a turbine 192 that receives a portion (e.g., the first portion) of the exhaust gas, as introduced above. The turbocharger arrangement 190 further includes a compressor 194 that is driven by the turbine 192. The compressor 194 functions to compress the ambient or charge air that enters the air intake arrangement 130 via the air intake conduit 132. Generally, the turbine 192 may be a variable-geometry turbocharger turbine, wastegate (WG) turbocharger turbine, fixed geometry turbocharger turbine, electrically controlled or assisted turbocharger turbine, and/or any other suitable type of turbocharger turbine. Although not shown, the turbocharger arrangement 190 may further include a second turbine that receives the portion (e.g., the second portion) of the exhaust gas after the exhaust gas flows through the turbine 192 and a second compressor that is driven by the second turbine to compress the intake air upstream of the compressor 194.

Although not shown, an EGR arrangement may also be provided. The EGR arrangement is generally configured to direct at least a first portion of exhaust gas out of the engine and then back to the air intake arrangement of the engine for combustion.

Generally, any type of sensor may be provided to facilitate operation of the power system 108, including the example sensors 200a-200i schematically depicted in FIG. 2. Such sensors 200a-200i may be configured to provide measured or derived characteristics of the power system 108 to the controller 110 for consideration in operation of the power system 108. One or more of the sensors 200a-200i may be omitted and/or additional sensors may be provided.

The sensors 200a-200d may be considered fuel sensors positioned within or proximate to the fuel arrangement 150. In particular, one or more fuel tank sensors 200a may be provided to determine various characteristics of the blended fuel, including quantity, quality, and/or the like.

In some examples, fuel tank sensor 200a may provide indications of the fuel blend constituents. As an example, the fuel tank sensor 200a may be a sound speed sensor that determines the relative amounts of methane ($CH_4$) and hydrogen ($H_2$) in the fuel, although other types of sensors may be provided for this purpose.

As a further example, the fuel tank sensor 200a may be an sensor that collects information that enables the controller 110 to determine or otherwise derive fuel characteristics, including the presence and the amount of ethanol ($C_2H_6O$), e.g., to reflect that the blend is an ethanol ($C_2H_6O$) and hydrogen ($H_2$) blend and the relative amounts. As noted above, the fuel tank sensor 200a may be fluid density or conductivity measurements. In particular, a density measurement from sensor 200a may determine a ratio of ethanol ($C_2H_6O$) relative to the biodiesel (B100). Moreover, conductivity measurements from sensor 200a may provide an indication of the ratio of ethanol ($C_2H_6O$) relative to biodiesel (B100) based on conductivity differences of ethanol ($C_2H_6O$) and biodiesel (B100). Generally, the accuracy of such measurement may be within approximately 5% of nominal ethanol ($C_2H_6O$) content. In addition to identifying ethanol ($C_2H_6O$) as a constituent, such measurements from sensor 200a may additionally indicate if the ethanol ($C_2H_6O$) has been diluted by water.

Example composition and electric conductivity information from which the composition of the fuel blend may be derived is reflected in Table 2.

TABLE 2

|  | Unit | Air | diesel | CH4 | CH3OH/CH4O | CH3CH2OH | water |
|---|---|---|---|---|---|---|---|
| CHxOy + (x/2 + 2 − y)/2 O2 = CO2 + x/2H2O |  |  |  |  | Methanol | Ethanol |  |
| X | number | 0 | 1.85 | 4 | 4 | 3 |  |
| Y | number | 0 | 0 | 0 | 1 | 0.5 |  |
| Fuel modular weight (g/mole) |  |  | 13.85 | 16 | 32.0 | 23.0 |  |
| A/F |  |  | 14.5 | 17.17 | 6.4 | 9.0 |  |
| O2 wt % | % | 23% | 0.00% | 0.00% | 0.00% | 0.00% |  |
| N2 wt % | % | 76.7% | 71.75% | 72.48% | 66.39% | 69.00% |  |
| H2O wt % | % | 0% | 7.76% | 12.38% | 15.12% | 11.79% |  |
| CO2 wt % | % | 0% | 20% | 15% | 18% | 19% |  |
| Air modular weight (g/Mole) |  | 28.93 |  |  |  |  |  |
| conductivity picoSiemens/m |  |  | 0.3 |  | 3.80E+06 | 1.35E+05 | 1.00E+09 |

Example density information from which the composition of the fuel blend may be derived is reflected in Table 3.

TABLE 3

| Fuel @25° C. | Density (kg/L) |
|---|---|
| Diesel | 0.850 |
| Renewable diesel | 0.780 |
| Gasoline | 0.741 |
| B100 | 0.880 |
| Methanol | 0.803 |
| Ethanol | 0.790 |
| Water | 1.000 |

The fuel arrangement 150 may further include fuel sensors 200b, 200c, 200d to measure or otherwise derive various additional characteristics of the fuel, including fuel temperature, fuel pressure, and fuel flow.

The sensors 200e, 200f, 200g may be considered exhaust sensors positioned between within or proximate to the exhaust arrangement 170 in order to determine or otherwise derive various characteristics of the exhaust. In the depicted example, one or more sensors 200e may be positioned downstream of the engine 120, in between the turbine 192 and the exhaust treatment component 176; one or more sensors 200f may be positioned in between the exhaust treatment component 176 and the exhaust treatment component 178; and one or more sensors 200g may be positioned in downstream of the exhaust treatment component 180, proximate to exhaust conduit 174. As examples, the exhaust sensors 200e, 200f, 200g may be carbon dioxide ($CO_2$) sensors, water ($H_2O$) sensors, oxygen ($O_2$) sensors, nitrogen oxides ($NO_x$) sensors, and/or temperature sensors.

In some examples, one or more of the exhaust sensors 200e, 200f, 200g may gather information that may be used to determine fuel blend constituents. In particular, exhaust sensors 200e, 200f, 200g may include carbon dioxide ($CO_2$) and oxygen ($O_2$) measures that may indicate a blend of methane ($CH_4$) and hydrogen ($H_2$).

In some examples, particularly during stoichiometric combustion modes (e.g., (e.g., $\lambda=1$)), one or more of the exhaust sensors 200e, 200f, 200g may be an oxygen ($O_2$) sensor at engine exhaust provides a feedback signal for controlling the air fuel ratio. However, for lean burn combustion mode (e.g., $\lambda>1$), the combustion results in excess oxygen ($O_2$) present in exhaust. In such examples, the controller 110 may evaluate the air flow rate to control engine air-fuel (A/F) ratio to a desired value. The air flow rate may be determined with a mass air flow meter at engine intake and a wide range oxygen ($O_2$) sensor at the exhaust. In other examples, the air flow may be calculated based a speed density method using boost pressure, engine rpm, displacement with a correction for cylinder breathing efficiencies. In any event, the desired air-fuel (A/F) ratio and power output may be achieved by the control of fuel quality through a feedforward control strategy. Additionally, fresh air flow and fuel flow make up the exhaust flow which is used to control aftertreatment and determine the appropriate DEF dosing rate for SCR reactions along with the nitrogen oxides ($NO_x$) concentration readings from an exhaust nitrogen oxides ($NO_x$) sensor.

One or more sensors 200h may be engine sensors, positioned within or proximate to the engine 120 to determine various types of engine characteristics. Additionally, one or more sensors 200i may be air flow sensors, positioned within or proximate to the air intake arrangement 130 to determine various type of intake air characteristics.

As introduced above, the controller 110 may control operation of the engine 120 and other aspects of the power system 108, as well as various other cooperating systems and components. In particular, the controller 110 may selectively command operation of the air intake arrangement 130, the fuel arrangement 150, and the exhaust arrangement 170 to provide desired ignition, combustion, and emissions characteristics within the engine 120 under all appropriate conditions. Generally, the controller 110 (FIG. 1) may be in communication with various aspects of the power system 108 to collect information about operation of the power system 108 and to implement or command modification and/or maintenance of such operation. As examples, the controller 110 may command parameters such as fuel quantity, start of injection, and desired air-fuel (A/F) ratio and EGR rate.

As introduced above, the controller 110 may particularly command the air intake arrangement 130, the fuel arrangement 150, and the exhaust arrangement 170 according to one or more control modes, including a stoichiometric control mode in which a stoichiometric ratio of air and fuel is injected into the engine 120 (e.g., $\lambda=1$); a lean control mode in which an amount of air that is greater than a stoichiometric amount for the corresponding amount of fuel (or provides an amount of fuel that is less than a stoichiometric amount for the corresponding amount of air) is injected into the engine 120 (e.g., $\lambda>1$); and/or in some instances, a rich control mode in which an amount of air that is less than a stoichiometric amount for the corresponding amount of fuel (or provides an amount of fuel that is more than a stoichiometric amount for the corresponding amount of air) is injected into the engine 120 (e.g., $\lambda<1$). Broadly, lean ratios may result in excess remaining oxygen ($O_2$), higher thermodynamic efficiencies, and lower exhaust temperatures, as compared stoichiometric ratios; and rich ratios may result in unburned fuel, lower temperatures, and lower efficiency. The values of the stoichiometric, lean, and rich ratios may vary based on the particular fuel and air compositions. In addition to controlling the air-fuel ratio, the controller 110 may further command aspects of the exhaust arrangement 170 in order to address emissions issues, particularly in the lean control mode.

As previously discussed and detailed in greater detail below, the controller 110 may operate to determine and/or otherwise derive fuel blend characteristics, apply feedforward control mechanisms based on the fuel blend characteristics, and modify such control parameters based on information from the exhaust sensors 200e, 200f, 200g. Additionally, in some examples, the sensors 200a-200i and/or controller 110 may operate diagnostically in order to confirm assumptions or estimates about fuel blend characteristics and/or other operating parameters. In particular, the controller 110 may command operation in a stoichiometric control mode; and upon operation in the stoichiometric control mode, the sensors 200a-200i may collect information about air flow from an air flow meter or calculated based on speed density when engine out oxygen level is at zero as indicated by an exhaust oxygen sensor in order to determine the current or actual A/F ratio. The A/F ratio may be compared to the stoichiometric A/F ratio for the characteristics of the estimated or derived fuel blend in order to confirm or correct the determined fuel blend characteristics. In effect, such diagnostics at the stoichiometric ratio enable the controller 110 to periodically or occasionally "check" the calculations about the fuel blend by confirming that intended stoichiometric operation is actually operating at a stoichiometric ratio.

Figure 3:
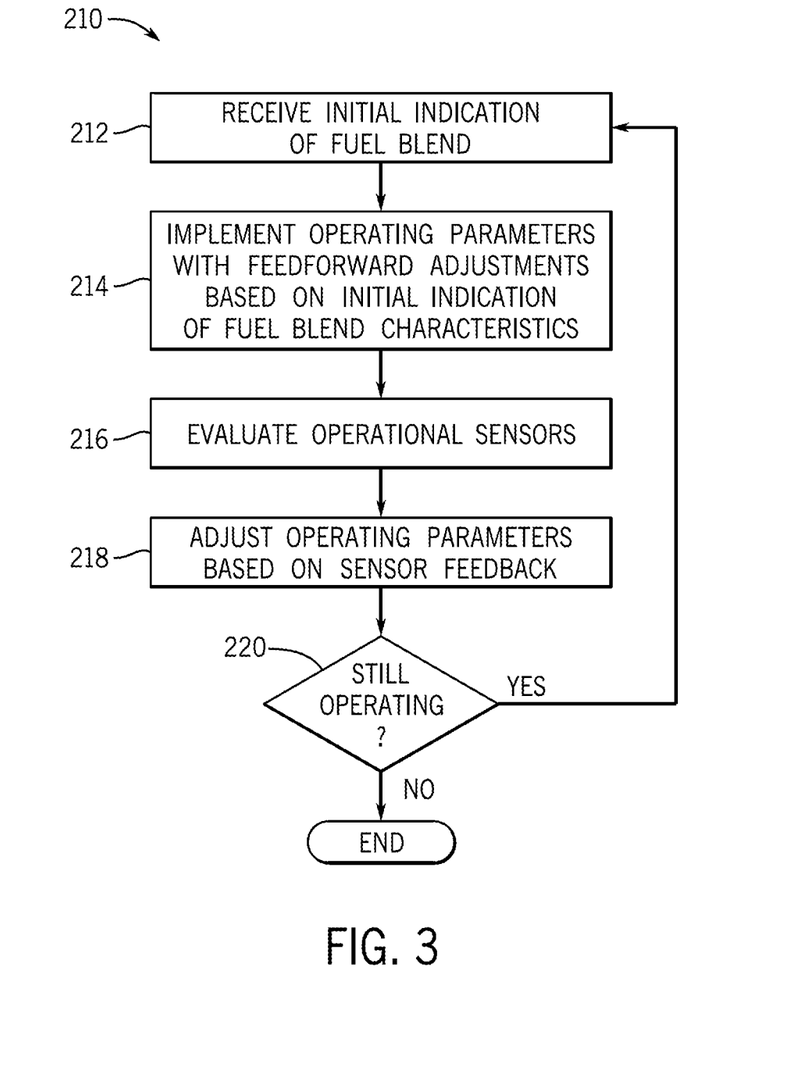
FIG. 3 is a flowchart of a method for operating a power system, such as that shown in FIG. 2, in accordance with an example embodiment.

The power system 108 depicted in FIG. 2 is merely one example of a power system that may utilize a low carbon fuel blend in a manner to enhance efficiency and reliability with respect to ignition, combustion, and/or emissions, as discussed in greater detail below with reference to FIG. 3. Other configurations of power systems may be provided.

Operation of the power system 108 is discussed with reference to the flowchart of FIG. 3 that depicts an example method 210 of operation that may be implemented by the controller 110 and other aspects of the power system 108 of FIG. 2. In the discussion of FIG. 3 below, reference is additionally made to FIG. 2.

In a step 212 upon initiating operation, an initial indication about the composition of the fuel is evaluated and/or determined. Various mechanisms may be implemented to determine fuel composition.

In particular, fuel tank sensor 200a may provide indications of the fuel blend constituents. As noted above, the fuel tank sensor 200a may be an sensor that enables the controller 110 to determine or otherwise derive fuel characteristics, including the presence and the amount of ethanol ($C_2H_6O$), e.g., to reflect that the blend is an ethanol ($C_2H_6O$) and hydrogen ($H_2$) blend and the relative amounts. As noted above, the fuel tank sensor 200a may rely upon fluid density or conductivity measurements to further derive and/or determine the characteristics of the fuel blend. In further examples, the fuel tank sensor 200a may be a sound speed sensor.

In some examples, one or more of the exhaust sensors 200e, 200f, 200g may also gather information that may be used to determine fuel blend constituents. In particular, exhaust sensors 200e, 200f, 200g may include carbon dioxide ($CO_2$) and oxygen ($O_2$) measures that may indicate a blend of methane ($CH_4$) and hydrogen ($H_2$).

In a further example, the power system 108 may have a predetermined, default, or operator-selected fuel blend that provides such an initial indication, although as described below, the specific relative ratio of a fuel blend may vary in practice. For example, the results of step 212 may be based on the most common or intended fuel blend, e.g., a 50%/50% (by weight) blend of methanol ($CH_3OH$) or ethanol ($C_2H_6O$) and biodiesel (B100), or a 50%/50% (by volume) blend of methane ($CH_4$) and hydrogen ($H_2$). Calibration maps may incorporate the determined or derived values, as well as the predetermined or assumed values.

As noted above, the initial indication may be applicable to various types of fuel blends, including an alcohol (e.g., methanol ($CH_3OH$) or ethanol ($C_2H_6O$)) and biodiesel (B100) blend or a methane ($CH_4$) and hydrogen ($H_2$) blend, although other types of blends may also be provided.

In step 214, the controller 110 implements a set of operating parameters. The operating parameters include feedforward adjustments based on the initial indication of fuel blend characteristics. The set of operating parameters with the feedforward adjustments may include commands such as fuel quantity, start of injection, and desired air-fuel (A/F) ratio and EGR rate, as appropriate. Generally, the feedforward adjustments may be used to correct for fuel energy and adjust fuel quantity, desired boost and diluent in the feedforward control.

In step 216, the controller 110 evaluates one or more operational sensors, such as sensors 200a-200i that include information about fuel characteristics, air flows, emissions information, and the like; and in step 218, the controller adjusts the operating parameters based on the sensor feedback, particularly from exhaust sensors 200e-200g. The information from operational sensors, particularly those from exhaust sensors 200e-200g, are used to fine tune or otherwise correct the feedforward adjustments from the initial indication of fuel blend characteristics. In particular, the exhaust sensors 200e-200g provide additional information about the composition of the fuel blend, e.g., in order to account for blend variations.

As examples, the exhaust sensors 200e-200g provide characteristics such as engine out carbon dioxide ($CO_2$) concentrations in exhaust with a correction for ambient base carbon dioxide ($CO_2$) at engine zero fueling conditions. Such concentrations may be used with the feedforward adjustments and the constituent estimates to verify fuel blend and adjust combustion parameters. The use of oxygen ($O_2$) and carbon dioxide ($CO_2$) sensor signals provides feedback to trim fuel injections and adjust combustion recipe of alcohol and biodiesel (B100) blend. For example, the use of oxygen ($O_2$) and/or carbon dioxide ($CO_2$) sensors enable a control action which reacts to sudden ethanol ($C_2H_6O$) concentration increase at air intake due to crankcase evaporation of the alcohol (e.g., ethanol ($C_2H_6O$)) of the fuel blend within the engine 120.

With respect to a methane ($CH_4$) and hydrogen ($H_2$) blend, the exhaust sensors 200e-200g provide characteristics such as measurement of carbon dioxide ($CO_2$) and oxygen ($O_2$) concentration in exhaust to determine a more refined methane ($CH_4$)/hydrogen ($H_2$) blend ratio. Injection quality, combustion parameters can be adjusted deliver target power, properly manage combustion and emission control engine out carbon dioxide ($CO_2$) concentrations in exhaust with a correction for ambient base carbon dioxide ($CO_2$) at engine zero fueling conditions. Such concentrations may be used with the feedforward adjustments and the constituent estimates to verify fuel blend and adjust combustion parameters. The use of oxygen ($O_2$) and carbon dioxide ($CO_2$) sensor signals provides feedback to trim fuel injections and adjust combustion recipe of hydrogen ($H_2$) and oxygen ($O_2$) blend, as well as to avoid knock or excessive nitrogen oxide ($NO_x$) formation.

Generally, as noted, the adjustments to the first set of operating parameters may include modifications to the commands for fuel quantity, start of injection, and desired air-fuel (A/F) ratio and EGR rate, as appropriate. Such adjustments may be intended to avoid knock or excessive nitrogen oxides ($NO_x$) formation.

In addition to the feedback for the operating parameters operating as control inputs, such information from the exhaust sensors 200e-200g may additionally function as diagnostic indications, e.g., in order to diagnosis and address air, fueling, and/or combustion issues.

As noted, the control and diagnostic mechanisms described herein are applicable to both compression and spark ignition engines. Moreover, the control and diagnostic mechanisms may be applicable to various combustion modes. For example, steps 212, 214, 216, 218 are particularly applicable to a lean combustion mode in which excess oxygen ($O_2$) is present in the exhaust. In further examples, steps 212, 214, 216, 218 are applicable to more a stoichiometric combustion mode. In some instances, particularly with a fuel blend of methane ($CH_4$) and hydrogen ($H_2$), the method 210 may include one or more transition between stoichiometric and lean modes based on factors such as load and temperature. For example, the method 210 may function to command operation in a stoichiometric combustion mode during relatively low temperatures and loads, and then transition to a lean combustion mode during relatively high temperatures and load.

In step 220, the controller 110 determines if the power system 108 is still operating. If so, the method 212 returns to step 216 to repeat the steps 212, 214, 216, 218 of the method 210. If not, the controller 110 terminates operation.

Accordingly, the power systems discussed above provide the ability to use a blended low carbon fuels in a work vehicle engine over a range of conditions by evaluating the constituents of the fuel blend, application of a feedforward control scheme, and adjustments based on emission sensors. Such an arrangement enables a low carbon, blended fuel power system. Overall, the power systems described herein result in a platform architecture that may provide improved fuel consumption, higher performance, and reduced criteria pollutants over a relatively wide temperature operating window.

As will be appreciated by one skilled in the art, certain aspects of the disclosed subject matter may be embodied as a method, system (e.g., a work vehicle control or power system included in a work vehicle), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A power system for a work vehicle, comprising:
   an intake arrangement configured to intake charge air;
   a fuel arrangement including a single fuel tank configured to store a low carbon fuel blend of multiple fuels as a single fuel source;
   an engine including a plurality of piston-cylinder sets configured to receive, ignite, and combust a mixture of the charge air and the low carbon fuel blend;
   an exhaust arrangement positioned downstream to receive exhaust from the engine during combustion of the low carbon fuel blend;
   an exhaust sensor positioned at or proximate to the exhaust arrangement; and
   a controller coupled to the exhaust sensor, the intake arrangement, the fuel arrangement, and the engine and configured to:
   determine an initial indication of a composition of the low carbon fuel blend;
   implement operating parameters with feedforward adjustments based on the initial indication of the composition of the low carbon fuel blend;
   receive feedback from the exhaust sensor regarding operational conditions; and
   adjust the operating parameters based on the feedback from the exhaust sensor.

2. The power system of claim 1, further comprising a fuel sensor positioned at or proximate to the fuel tank of the fuel arrangement.

3. The power system of claim 2, wherein the initial indication of the composition of the low carbon fuel blend is based on information from the fuel sensor positioned at or proximate to the fuel tank of the fuel arrangement.

4. The power system of claim 3, wherein the fuel sensor is a density sensor.

5. The power system of claim 3, wherein the fuel sensor is a conductivity sensor.

6. The power system of claim 1, wherein the initial indication of the composition of the low carbon fuel blend is based on information from the exhaust sensor.

7. The power system of claim 1, wherein the controller is configured to operate the intake arrangement, the fuel arrangement, and the engine in a lean combustion mode.

8. The power system of claim 1, wherein the engine is a compression ignition engine.

9. The power system of claim 8, wherein the low carbon fuel blend is an ethanol ($C_2H_6O$) and biodiesel (B100) fuel blend.

10. The power system of claim 8, wherein the low carbon fuel blend a methanol ($CH_3OH$) and biodiesel (B100) fuel blend.

11. The power system of claim 1, wherein the engine is a spark ignition engine, and wherein the low carbon fuel blend is a methane ($CH_4$) and hydrogen ($H_2$) fuel blend.

12. The power system of claim 1, wherein the exhaust sensor includes a carbon dioxide ($CO_2$) sensor arranged in or proximate to the exhaust arrangement.

13. The power system of claim 1, wherein the exhaust sensor includes an oxygen ($O_2$) sensor arranged in or proximate to the exhaust arrangement.

14. The power system of claim 1, wherein the exhaust sensor includes one or more of a nitrogen oxide ($NO_x$) sensor, an oxygen ($O_2$) sensor, or a carbon dioxide sensor ($CO_2$) positioned at or proximate to the exhaust arrangement.

15. A method for operating a power system with an intake arrangement, a fuel arrangement with a low carbon fuel blend of multiple fuels as a single fuel source contained in a single fuel tank, an engine, and an exhaust arrangement, the method comprising:
   determining, at a controller, an initial indication of a composition of the low carbon fuel blend;
   implementing, by the controller, operating parameters for the fuel arrangement, the intake arrangement, and the engine with feedforward adjustments based on the initial indication of the composition of the low carbon fuel blend;
   receiving, at the controller, feedback from an exhaust sensor regarding operational conditions; and
   adjusting the operating parameters based on the feedback from the exhaust sensor.

16. The method of claim 15, wherein the power system further includes a fuel sensor positioned at or proximate to the fuel tank of the fuel arrangement, and wherein the determining the initial indication of a composition of the low carbon fuel blend includes determining the initial indication based on information from the fuel sensor.

17. The method of claim 16, wherein the fuel sensor is one or more of a density sensor or a conductivity sensor.

18. The method of claim 17, wherein the low carbon fuel blend is one of an ethanol ($C_2H_6O$) and biodiesel (B100) fuel blend, a methanol ($CH_3OH$) and biodiesel (B100) fuel blend, or a methane ($CH_4$) and hydrogen ($H_2$) fuel blend.

19. The method of claim 15, wherein the exhaust sensor includes one or more of a nitrogen oxide ($NO_x$) sensor, an oxygen ($O_2$) sensor, or a carbon dioxide sensor ($CO_2$) positioned at or proximate to the exhaust arrangement.

20. The method of claim 15, further comprising:
commanding, with the controller, operation according to an expected stoichiometric A/F ratio;
determining a resulting A/F ratio;
comparing the resulting A/F ratio to the expected stoichiometric A/F ratio in order to evaluate the determination of the composition of the low carbon fuel blend.

* * * * *